March 17, 1942. W. C. GOSS 2,276,649
RETORT
Filed June 18, 1938 2 Sheets-Sheet 1

INVENTOR
WORTH C. GOSS
BY
Cook & Robinson
ATTORNEY

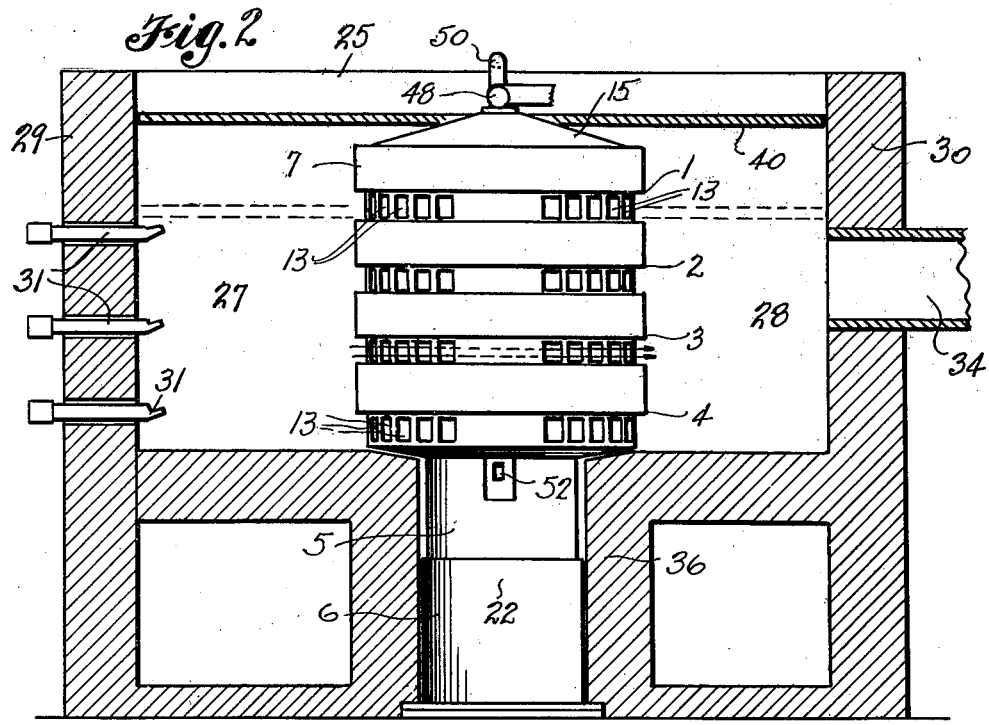
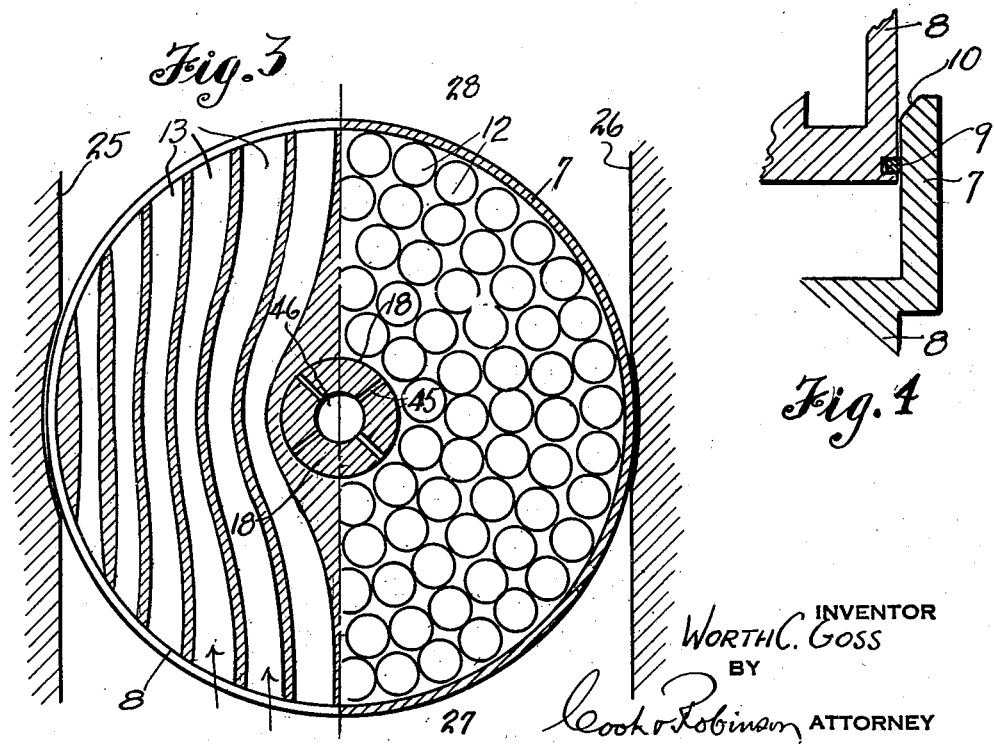

Patented Mar. 17, 1942

2,276,649

UNITED STATES PATENT OFFICE 2,276,649

RETORT

Worth C. Goss, Seattle, Wash.

Application June 18, 1938, Serial No. 214,535

6 Claims. (Cl. 202—110)

This invention relates to a retort designed for use in the preparation of what is now generally known in the art as "primary carbon"; that is, a carbonized material for the manufacture therefrom of an activated gas and vapor adsorptive product of granular form suitable for use in gas masks; for purification of air and for other uses.

More specifically stated, the present invention has reference to a novel form of retort, or charring apparatus for the treating and carbonizing therein of previously formed briquettes of highly compressed comminuted wood materials. The treating, or carbonizing, of the wood briquettes is carried on while they are being subjected to high mechanical pressure, as well as while being retained in the pressure of their distillate gases. This produces an exceedingly dense char, substantially free of waste pore volume, and an extreme adsorption of heavy hydrocarbons in the char.

Explanatory to the present invention, it will here be stated that the adsorptive qualities of charred or carbonized carbonaceous materials after activation are dependent to a certain extent upon their effective pore volume. Charcoal, which may appear to be relatively dense, in reality may contain a very large percentage of waste pore volume comprised by those pores which are too large to be effective for the taking up of gas or vapors. Materials denser than ordinary wood, such as cocoanut shells, when charred, produce a primary carbon that is much more effective when activated than ordinary wood charcoal. Likewise, charcoal that is produced from hard wood generally is more adsorptive than that produced from soft wood because it contains less waste pore volume, and even the best grade of activated cocoanut shell charcoal, prepared by non-chemical methods, has a useful pore volume of only forty to seventy percent of its total pore volume. Activated carbon made from ordinary Douglas fir charcoal has an effective pore volume of only 10%.

Thus, it can be understood that if a satisfactory carbon is to be produced from wood, and particularly from soft wood, such as the Douglas fir of the Pacific Northwest, it is essential that there be some special treatment given it to render the charred product of greater density than that which it would have under the ordinary treatments given cocoanut shells or hardwoods in the production of carbon; it being essential in the making of a "primary carbon" of commercial value, that it shall contain not more than forty per cent waste pore space. This is far less than the amount occurring in soft wood charcoal not given any special treatment to make it of greater density.

In the present invention, I have found that the denser the carbonized product, and the smaller the percentage of waste pore volume, the more adsorptive will be the material. Also, I have considered the fact that if the briquettes of comminuted wood which are to be carbonized are initially formed under extremely high mechanical pressures, the cell structure of the individual particles of wood will, to a considerable extent, be compressed and broken down and a material percentage of the waste pore volume thereby eliminated. Furthermore, I have designed the present equipment for charring wood briquettes that have previously been formed under extremely high pressure, with the idea in mind that if these briquettes are subjected to high mechanical pressure during the charring or carbonizing operation, they will be further compressed and thus rendered more dense and the waste pore volume decreased accordingly.

Furthermore, I have made provision in the present carbonizing equipment for confining the wood briquettes during the charring operation, in the pressure of their distillate gases so that they will become impregnated to a maximum extent with heavy hydrocarbons. This tends to reduce further the waste pore volume and better prepare the product for a finishing heat treatment prior to the process of activation but following the charring operation. This treatment is described in a co-pending application for patent, Serial No. 216,020.

Without going into detail with reference to the treatment of the briquettes either before or after the charring or carbonizing operation in the present retort, it is thought sufficient to say that the carbonized briquettes, after removal from the retort, are first crushed into granules and in this form are given a specific heat treatment, which is followed by treatment with superheated steam in such way that the granules are rendered active.

Heretofore, such apparatus as has been used in the charring of briquettes to provide a primary carbon has, to my knowledge, been inadequate for rapidly preparing primary carbon in any large quantities. The retorts have been cumbersome, of small capacity and have required considerable time both for charging and for unloading.

In view of the foregoing, it has been the principal object of this invention to provide an apparatus of large capacity with reference to the number of briquettes to be contained for treatment at one time. This apparatus, having a plurality of carbonizing chambers for easy loading and unloading thereof, provides for applying mechanical pressure evenly to each and every briquette in the various chambers during the carbonizing operation, provision being made for confining the briquettes in the pressure of their distillate gases to cause impregnation with heavy hydrocarbons. This mechanical and gaseous pressure makes possible the production of charred material of a degree of density and absence of waste pore volume that renders it exceptionally desirable for the manufacture of granulated activated carbon for the various uses previously stated, as well as for other uses not specifically mentioned.

Still further objects reside in the details of construction, and in the combination of parts and their mode of assembly, as will hereinafter be fully described.

In accomplishing these and other objects of the invention, I have provided the improved details of construction, the preferred forms of which are illustrated in the accompanying drawings, wherein—

Fig. 2 is a longitudinal section of the furnace with retort disposed therein.

Fig. 3 is a horizontal section on two different lines, as on line 3—3 in Fig. 1, showing the disposition of briquettes for charring in one of the trays of the retort, and illustrating the heat passages in the base of a tray.

Fig. 4 is a sectional detail.

Figure 1:
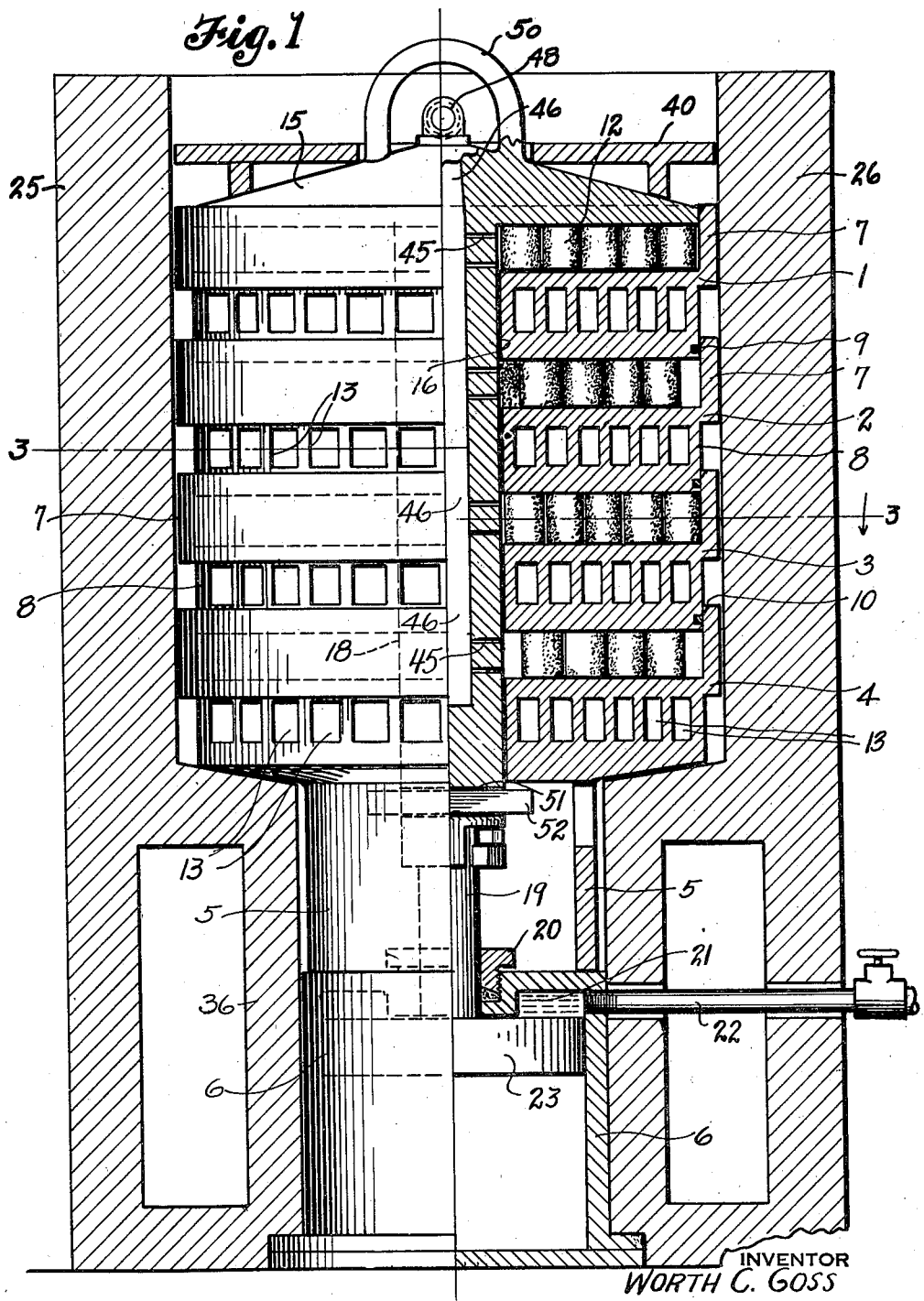
Fig. 1 is a view of the present briquette charring equipment shown in vertical cross section, the retort being shown partly in elevation for better understanding.

The present equipment comprises a furnace, and a retort. The retort is of special construction and the furnace is designed to receive the retort therein. Furthermore, the retort is so arranged that it may be lifted from or lowered into the furnace and special devices are provided to hold the parts of the retort assembled and for applying pressure to the briquettes contained therein during the charring thereof.

In the present preferred form of retort, there is provided a series of circular, superimposed trays, each adapted to have a great number of briquettes of the same size arranged therein in a single layer upon the flat bottom of the tray. Each of the several trays is supported directly upon the layer of briquettes contained in the next lower tray and a means is provided for exerting a downward force upon a cover member applied to the topmost tray, and in a manner whereby this force is transmitted to all briquettes of the several trays for the purpose of effecting the compressing of the briquettes during their charring or carbonizing treatment. For the charring operation, the entire retort, with its various trays filled, is disposed in the furnace and is evenly heated by means later described, to a temperature of approximately 1,000° Fahrenheit, which is maintained during the treatment.

Each of the several trays has a peripheral wall serving as an enclosing cylinder, and each tray also has a piston-like base extension that is fitted slidably within the cylinder wall of the next lower tray. Each piston-like base portion in the assembly seats directly upon the layer of briquettes in that tray therebeneath for the application of the condensing pressure, and serves also to close the cylinder against excessive leakage of gas distilled from the briquettes during the carbonizing process so that a sufficient gas pressure may be maintained in the retort to cause the impregnation of the briquettes with the hdyrocarbons, as previously stated.

Referring now more in detail to the drawings—

In Figs. 1 and 2, it will be observed that there are four horizontally disposed circular trays, designated respectively by reference characters 1, 2, 3 and 4, arranged in superimposed relation and the assembly of trays is supported upon the lower tray 4 which is provided with a central cylindrical supporting pedestal 5. In this instance, the pedestal is integral with the base portion of the lower tray and it, in turn, is adapted, when the retort is disposed in the furnace as seen in Fig. 1, to rest upon the upper, closed end of a hydraulic cylinder 6.

Each of the several trays embodied in the retort assembly has a vertical, peripheral wall 7 that extends substantially above the level of the layer of briquettes contained in the tray for carbonization, and each tray also has a downwardly extended bottom structure 8 of piston-like character, adapted to fit slidably within the cylindrical wall 7 of the next lower tray.

It will here be mentioned that the piston-like portions 8 of the various trays are equipped with packing rings, as at 9, to eliminate gas leakage from the trays. Also, the inner peripheral edge of the wall 7 of each tray is beveled, as at 10, to facilitate the assembly of the trays and fitting of the piston portions in the wall cylinders 7.

For the charging of the retort for a briquetting operation, the several trays are first disassembled, and the briquettes, as designated by numeral 12, are arranged on end and in close relation in the separated trays, as seen in Fig. 3. Then the several trays are successively assembled one upon the other as seen in Figs. 1 and 2, all being supported by tray 4. It will be noted also in Fig. 1, that the base, or piston-like portion 8 of each tray fits within the cylindrical wall 7 of the next lower tray and that the bottom of each tray is flat and rests upon the briquettes in the next lower supporting tray, except for the lowermost tray which rests on the cylinder 6.

It will also be observed that the base portion 8 of each tray is equipped with a plurality of horizontal, closely placed channels 13, as shown best in Fig. 3, to facilitate heating of the trays for the carbonizing or charring of the briquettes; these channels opening at their ends to opposite sides of the trays for a purpose presently described.

Overlying the briquettes of the top tray is a cover plate or cap 15, the periphery of which is slidably fitted, as a piston, within the cylindrical wall 7 of the top tray. Fixed to and extending from the cover plate downwardly and centrally through openings 16 provided therefor in the bottom structures of the various trays, is a shaft 18. This shaft terminates within the tubular pedestal 5 and is there equipped for a quarter-turn coupling connection with the upper end of a piston rod 19 that extends upwardly through a leak-tight packing gland 20 in the upper end wall of the hydraulic cylinder 6. A hydraulic medium, designated at 21, is applied within the upper end of the cylinder 6 through a pipe 22 to effect a downward application of pressure against a piston 23 fixed on rod 19 in the cylinder, and this pressure is transmitted through the shaft 18 to the cap 15 and thus is transmitted downwardly against the briquettes in the several trays to effect the desired compression of the briquettes as the charring takes place, thereby to reduce the waste pore volume in the material.

The coupling of the shaft 18 with the upper end of shaft 19 may be of any desirable kind adapted to be released and made by relative rotation of the parts when in contact.

In order that the briquettes may be quickly and effectively heated for the charring operation, I have provided a furnace into which the retort may be bodily lowered. This furnace, as seen in Figs. 1 and 2, is of rectangular form, open at the top, and, by reference to Fig. 1, it will be observed that the retort, when placed in the furnace, fits closely between the opposite side walls 25 and 26 of the latter. Chambers 27 and 28 are formed between the retort and front and rear walls 29 and 30 respectively. Oil burners of suitable character, as designated at 31, are provided for directing flame into the chamber 27 and through the horizontal channels 13 of the base structures 8 of the trays and a stack outlet 34 is provided in connection with the chamber 28 for inducing an effective draft and for escape of gases of combustion.

When the retort is in place for the charring of briquettes, the pedestal 5, as well as the hydraulic cylinder 6, is protected within the foundation structure 36 of the furnace.

In view of the fact that the retort decreases in height during a charring operation by reason of compression of the briquettes, it is desirable to provide a closure plate for the top of the furnace that travels with the cap or cover plate 15 of the retort. Such a plate is designated at 40 and it is of rectangular form to fit within the four walls of the furnace, as shown in Figs. 1 and 2, and it rests upon the cap 15, and moves down in the furnace as the retort decreases in height.

In assembling the trays and in placing the assembly in the furnace for a briquette charring operation, precaution is taken to see that all channels 13 open at their opposite ends into the chambers 27 and 28, so as to provide for the passing of the flame and heat of combustion through the bases of the trays.

It is a feature of this present construction that the piston-like bases 8 of the various trays fit the cylindrical walls 7 in a close joint which is made gas-tight by use of high-speed, steel piston rings or the like. Thus, when charring heat is applied, gases driven off from the briquettes will be retained. Gas passages 45 are provided in the central shaft 18, opening into a central bore 46 in the latter, and at the upper end of the bore 46 is a relief valve 48 that may be set to relieve gas at a predetermined pressure. In the present instance, the valve is set so as to hold a pressure up to 36 pounds per square inch absolute. Thus, the briquettes will be confined in their distillate gases and will be impregnated with heavy hydrocarbons and this has been shown to be of material aid in improving the results obtained by a subsequent heat treatment and also renders the product more dense by reason of filling waste pore volume. This results also in the creation of high activity with a low weight loss during activation.

As a detail of construction, the cap 15 is provided with a bail 50 for lifting the retort from and for lowering it into the furnace. Also, a hole 51 is bored through the lower end portion of shaft 18 to receive a pin 52 to prevent the shaft lifting out from the trays when the cap is lifted. Thus, when it is desired to lift the retort from the furnace, the cap 15 is rotated to disconnect the shaft 18 from the piston rod. Then a hook from a power crane is applied to the bail 50 on the cap and the entire assembly lifted out. Then the pin 52 is withdrawn and this permits the cap 15 to be removed. This frees the several trays so that they may be individually lifted, one from the other.

For a charring operation, the individual trays are filled with briquettes. Then, after they have been filled, they are reassembled, then the cap applied, so as to extend shaft 18 down into the cylinder 5; then, the pin 52 inserted, and the assembly then lifted and lowered into the furnace. Then, by rotation of the cap, the shaft 18 will be caused to interlock with the upper end of the piston rod 19.

It will be quite apparent that, with the parts assembled as shown in Fig. 1, and the entire device set in a furnace equipped with heating means as indicated, the whole retort may be evenly and effectively heated. It is also apparent that, with suitable hydraulic pressure applied, and incident to the heating, the briquettes will be compressed and further solidified. Thus, the waste pore volume is, to a very material extent, eliminated.

The provision for retaining the briquettes in the pressure of distillate gases is important although heretofore it has been taught that it was necessary or advisable to withdraw these gases. However, it has been demonstrated that there is a material advantage in the present mode of treatment, which causes an extreme impregnation of the briquettes with hydrocarbons.

In this way, and by this mechanism, a very excellent carbon is made, and the work may be carried on at a rate and scale that is commercially practical.

The special advantages in this method reside in the end charring of briquettes by plate contact under mechanical pressure. This feature of charring the briquettes from each and by application of heated plates thereto is a vital point in the formation of a very large percentage of solid dense char. If heat should be applied to all surfaces of a briquette, the central portion remains uncharred longer than the surface. This uncharred central portion acts as a supporting column, thus preventing densification of the outer briquette surface and of course this would result in a low yield of dense usable char. If the mechanical pressure is low and heat applied to all surfaces of the briquette, as per Hawley U. S. Patent No. 1,385,826 a solid moderately dense shell of carbon is formed on the outside of each briquette, and all the central portion of the char is of a light and fluffy consistency. This difficulty is almost entirely overcome in the present invention because carbonization proceeds uniformly inward from each end surface and not from the side surfaces of the briquette.

Having thus described my invention, what I claim as new therein and desire to secure by Letters Patent is:

1. In combination, a furnace having a stack connection at one end and burners in the opposite end, a retort adapted to be disposed in the furnace between said ends; said retort comprising a plurality of trays in superimposed relation, each for holding a layer of briquettes therein, and each having a base portion fitted in the next lower tray for support upon the material therein, and having channels therethrough for passage of gases and heat of combustion from one end of the furnace to the other.

2. In combination, a retort and a furnace adapted to contain the retort therein for heat treatment of contained material, and from which furnace the retort may be removed for unloading or charging; said retort comprising a plurality of trays arranged successively, one above the other, each to contain therein a layer of material for distillation, and each of said trays having side walls and a base structure designed to fit slidably within the next lower tray as a slip-fit closure to preclude leakage of distillate gases therefrom and to bear against the layer of material in the tray, a closure slidably contained in the upper tray and engaging the material therein, and means acting upwardly against the lower tray and downwardly against the said closure for the upper tray for applying compressing forces against the material in the several trays and to cause the telescoping of the trays together in accordance with the compression of material; the base structure of each tray being formed with passages for the flow of the furnace gases therethrough to expedite the heating of the several trays.

3. In combination, a furnace and a retort removably disposed in the furnace, for heat treatment of contained material, and dividing the furnace chamber between its opposite ends; said retort comprising a plurality of separable trays arranged successively, one above the other, each adapted to contain a layer of material therein for distillation, and each of said trays having side walls and a base structure slidably fitted within the side walls of the next lower tray for support upon the material in that tray and as a closure against the escape from the tray of distillate gases and having heating passages therein opening to the opposite ends of the furnace, a closure for the upper tray slidably fitted therein and contacting the contained material, a shaft extended from the closure member downwardly through the succession of trays, and means associated with the furnace for connection with the shaft for application of compressing forces to the material in the trays while under heat treatment.

4. A device as in claim 3 including means for the support of the retort by contact with the base of the lower tray and a hydraulic jack having a piston rod disconnectably attached to the lower end of the said shaft.

5. A device as in claim 3 wherein the lower end portion of the shaft extends beyond the base of the lowermost tray, and a key is removably applied through the lower end of the shaft to retain the trays in assembled relationship thereon, and means is provided at the upper end of the shaft for the lifting of the retort from the furnace.

6. In combination, a furnace and a retort removably disposed in the furnace for heat treatment of contained material; said retort comprising a plurality of separable trays arranged successively, one above the other, each adapted to contain a layer of material therein for distillation, and each of said trays having side walls and a base structure slidably fitted within the side walls of the next lower tray for compression of the material therein, and serving as an automatically adjustable closure for the prevention of the escape of distillate gases from the tray, a closure for the upper tray, a shaft extended from the closure, downwardly through the succession of trays, and means connected with the shaft for application of compressing forces to the material in the several trays while under heat treatment; said shaft being equipped with a longitudinal channel with openings therefrom into the several trays; said channel opening to the exterior of the retort and equipped at its discharge end with a pressure control valve.

WORTH C. GOSS.